Figure 1:
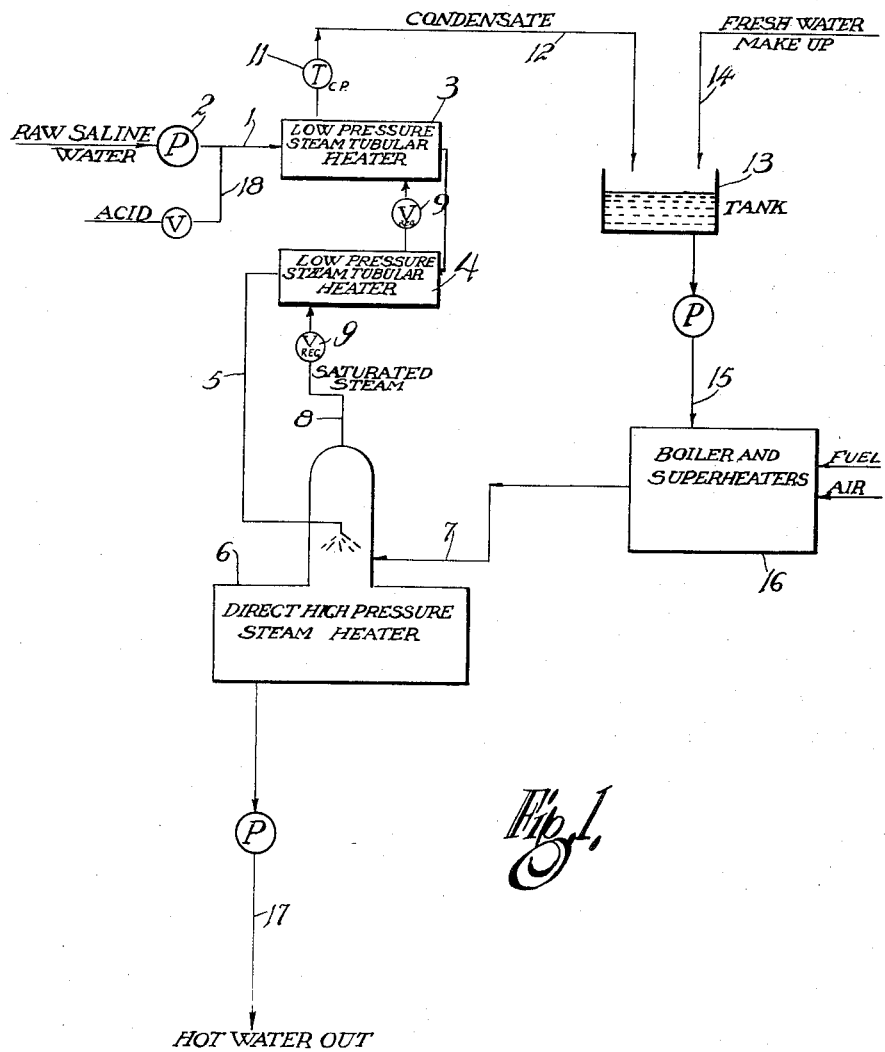

United States Patent Office

2,937,624
Patented May 24, 1960

2,937,624

SYSTEM AND PROCESS FOR THE HEATING OF WATERS AS FOR SULFUR MINING

Vas Hubert Brogdon, Jr., Port Sulphur, La., assignor to Freeport Sulphur Company, New York, N.Y., a corporation of Delaware Filed Feb. 24, 1953, Ser. No. 338,185

11 Claims. (Cl. 122—1)

This invention relates to a system and process for the heating of naturally-occuring waters of any and all types of large quantities, and it relates particularly to processes for the heating of sea or other saline water for use as process water in the mining of sulfur by the procedure basically known as the Frasch process.

In conventional processes for heating water for the mining of sulfur, only surface water, well water or other relatively pure waters (in relation to sea waters) are employed, because scale formation and corrosion by saline waters have been insurmountable barriers. The problems of scale formation using the purer waters have been met by chemical treatments. The water is first divided into two streams process-wise, one of which is used as boiler feed water and the other as mine water or water to be pumped into the sulfur deposit.

The first mentioned stream is given a relatively severe treatment to condition it for use as boiler feed water, as by treatment with suitable chemicals such as the conventional hot lime soda process and, after such treatment is complete the thus purified water is fed to steam generating boilers of conventional type.

The second stream constituting the miner water is also treated by chemical means such as lime soda but to a lesser extent, also to remove or lessen the content of scale-forming constituents and the thus treated mine water is then mixed with steam from the boilers under pressure to produce the the water at the desired temperature for the sulfur mining operation contemplated. The equipment ordinarily required for the chemical treatment includes mixing tanks, feed tanks, chemical feeders, water treating tanks, settling ponds or mechanical precipitators, filters, sludge disposal equipment and many auxiliaries.

Since sulfur mining plants require very substantial quantities of hot water, the above described water treating equipment is quite extensive and the operating costs including that of chemicals are very substantial. Prior to the development of the present invention, no sulfur mining operation was conducted without these costly water treating plants.

The general object of the present invention is to provide processes for heating water for sulfur mining purposes which involve very substantial savings in equipment and in operating, chemical and maintenance costs in comparison with conventional plant practice. A primary general objective is to provide a heating system in which water of any salinity can be used for the mine water stream, and in which substantially all water required for the boilers is produced as a "by-product" in the process.

Specific objects are (1) to eliminate hard scale deposition altogether where this is desirable, (2) to lessen corrosion by limiting and controlling deposition of scale to optimum values in the heating equipment and auxiliaries where the same are constructed of non-corrosion resistant materials, (3) to limit the total water to be treated by hot or cold lime-soda processes to an inconsequential amount or to eliminate the step entirely, (4) when the raw water is of high salt content, to cause the scale-forming constituents which unavoidably separate to come down for the most part in the form of a soft gelatinous material which can easily be washed from the system rather than in the form of a hard scale which adheres tenaciously, (5) to reduce the total chemical and labor costs for water treatment and (6) to lessen the amount of plant equipment required, all in relation to the mining of sulfur.

Another important object is to make it possible to use water from sources of higher salinity than heretofore utilizable in conventional sulfur mining equipment. Since the hardness or scale forming constituents present in water normally increase in direct proportion to the salt content, the cost of treatment progressively increases and the use of high salt content water has heretofore been impractical. By the present invention it is possible to use water of high salt content for the mine water stream thereby conserving the limited supply of good water for the boiler water stream.

Broadly stated, the process of the invention relates to the production of hot process water and may be considered to involve a combination of two or more heating steps in which natural, scale-forming or saline water are preliminarily heated by indirect heat exchange with substantially saturated steam through heating surfaces maintained at a temperature below that at which any substantial amount of hard scale forms on the said surfaces, thereby at the same time condensing said steam, then heating the resulting process water under superatmospheric pressure by directly contacting the same with superheated steam under pressure, removing substantially saturated steam from contact with said process water and utilizing the same in said preliminary heating step, collecting the condensate from said first step and converting the same back to superheated steam, and utilizing the resulting steam in said second heating step.

A primary feature of the invention is that scale-forming water is heated to sulfur mining temperatures of from 300–340° C. or higher by a heating treatment in which direct steam is employed rather than indirect steam applied through heat transfer surfaces of tubes or other equipment maintained at high temperature scale depositing levels, such heating being accomplished without requiring any, or any appreciable amount of chemically treated boiler water.

Another feature of the invention involves a preheating or intermediate heating step applied to the scale-forming water, in which step there is employed substantially saturated steam obtained from the subsequently operated heating step utilizing direct superheated steam. The heat applied in the indirect heat exchange step is regulated such that the temperature of the water-side of the exchanger tubes is below that at which hard scale, particularly calcium sulfate, is formed. The details for the regulation of the heating to accomplish this result are disclosed and claimed in copending patent applications filed by the present applicant and his co-worker, Bernard A. Axelrad, now Patents No. 2,756,035 and No. 2,756,207.

Yet another feature of the invention as applied to the mining of sulfur involves a complete mining plant in which balanced quantities of hot water, steam power, electric power, service water, compressed air for pumping the sulfur wells and steam for heating the sulfur handling equipment are provided.

Another feature involves the utilization of the waste flue gases containing carbon dioxide obtained from the boilers and superheaters to preheat saline waters whereby the scale-forming tendencies thereof are reduced in the subsequently employed steam heating steps.

The scale-forming water to which the invention is applicable includes all naturally occurring water, such as sea, river, well, lake and bayou waters which generally have a pH value from 7.2 to 8.5. These waters may be heated to temperatures of from 250–365° F. without any substantial corrosion or excessive deposition of hard scale. However, when water of very high content of scale-forming constituents is treated, the highest temperature within the range stated may not be attainable without causing excessive scale deposition. Sea and other waters of intermediate salinity may be heated to sulfur mining temperatures within the specified range, but as the salinity increases the maximum permissible temperature decreases somewhat.

Two embodiments are illustrated in the accompanying drawings which are wholly diagrammatic.

With reference to Figure 1 showing the first embodiment, raw saline water after being screened is pumped through the conduit 1 by means of the pump 2 into and successively through two low pressure steam tubular heaters 3 and 4. Here the water is heated to a temperature of from 250° to about 300° F. by indirect heat exchange with substantially saturated steam obtained in the process by the steps subsequently described.

The heated water leaving the heater 4 flows through the conduit 5 to an upper level or dome in a direct high pressure steam heater 6 where it is sprayed in countercurrent flow to superheated steam introduced at a somewhat lower level in the dome, the said steam being introduced through the conduit 7. The steam rises through the spray of water giving up its superheat and passes out of the top of the dome from whence it flows through the conduit 8 to and through the tubular heaters 4 and 3, respectively. Constant pressure regulating valves 9 and the conduit pressure steam trap 11 serve to maintain the correct pressure in the high pressure heater as well as in the low pressure tubular heaters. The steam condenses in the indirect heater 3 and flows through the trap 11 and conduit 12 to the fresh water storage tank 13.

Losses of water in the system are made up by fresh water from any available source introduced by the conduit 14 into said tank 13. The condensate thus obtained is then utilized to produce the superheated steam required in the direct high pressure steam heater 6 by pumping the same through the conduit 15 to gas fired boilers and superheater 16. Superheated steam flows from the superheater through the conduit 7 into the heater 6. In this heater 6 the hot saline water is heated to a temperature of from about 310 to 365° F. It is drawn from the heater 6 in the conduit 17 and pumped to its point of utilization.

The deposition of hard scale in the tubular heaters 3 and 4 is substantially prevented by limiting the temperature of the water-side of the tubes and such action may be facilitated, if desired or required, by the introduction of a small amount of a suitable acid through the conduit 18 leading into the conduit 1 connected to the heater 3. Examples of suitable acids are sulfur acid compounds (sulfuric, or $SO_3$ and sulfurous, or $SO_2$), carbon dioxide and hydrochloric acid preferably in liquid form. The amount and function of the acid in assisting in the heating operation by lessening objectionable hard scale formation is disclosed more in detail in the copending applications Serial No. 244,854, now abandoned, and Serial No. 253,306, now Patent No. 2,756,035.

Figure 2:
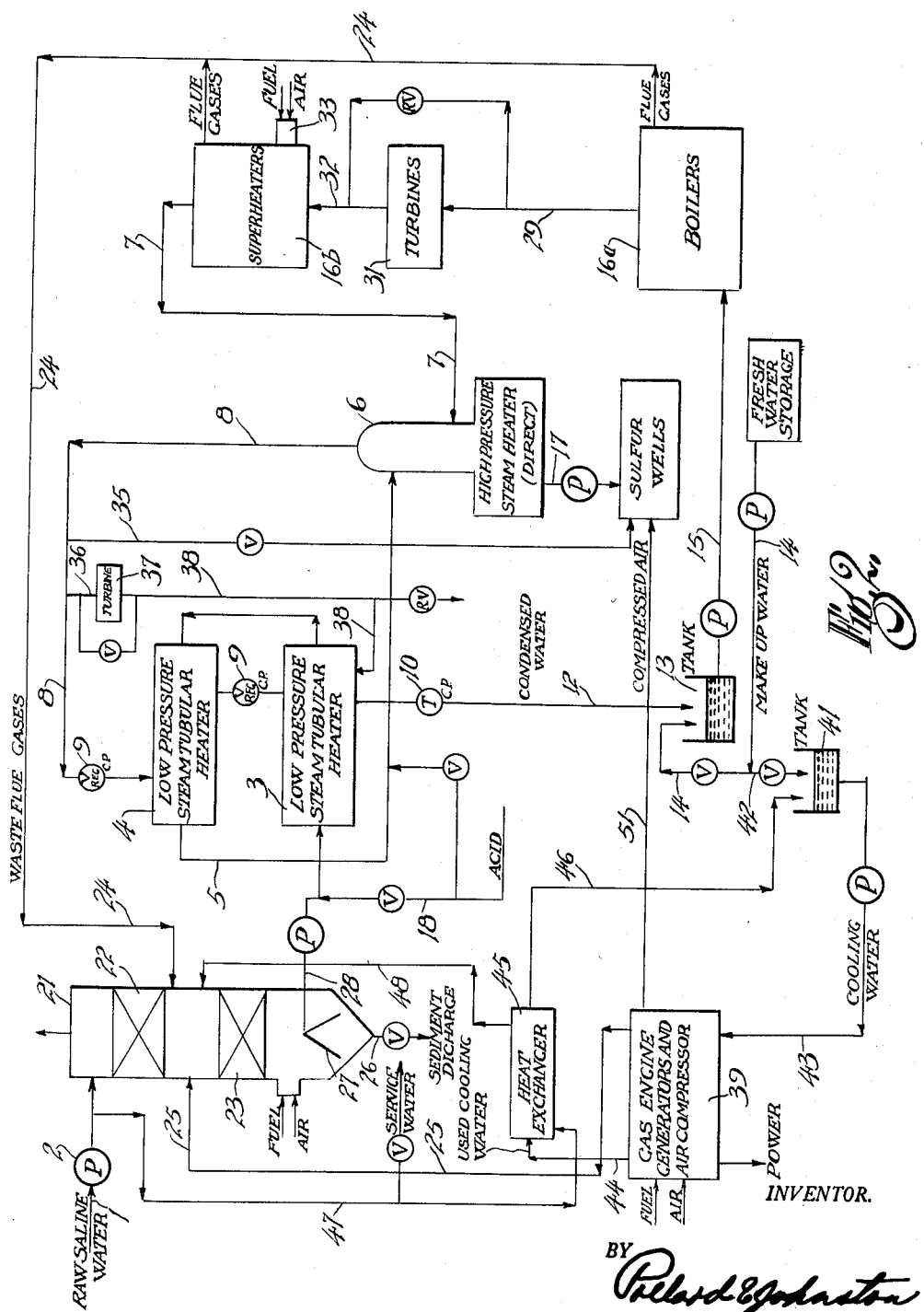

In Figure 2 there in diagrammatically illustrated an embodiment of the invention applied to the mining of sulfur. With reference to the drawing, screened raw saline water in the line 1, at the rate of 1400 g.p.m., is pumped to and sprayed into a heating tower or column 21 in which it flows successively through the packing 22 and packing 23 (of rings or slats) to the bottom of the tower. In passing through the upper section and packing 22 the water is initially heated by combustion gases introduced at an intermediate point, such gases being waste flue gases introduced by means of the conduits 24 and 25. In passing through a lower section of the tower containing the packing 23, the water is heated to a higher temperature by burner gases (45 million B.t.u./hr.) introduced at a lower level as shown. By this direct contact with combustion gases, carbon dioxide is taken up in the water and its scale forming potentialities are reduced. Through this direct preliminary operation, the water may be heated to a temperature suitably ranging from 110° to 195° F., as to 180° F.

In the bottom of the tower 21, suspended matter including organic material, diatoms and the like coagulates and settles in a pool. The settled matter may be continuously or periodically removed through the valve blowdown conduit 26, thereby preventing it from becoming scale-forming constituents later in the process. The thus purified partially heated water flows at the rate of 1200 g.p.m. from the top of the sludge cone 27 out of the tower in conduit 28 and is pumped into the low pressure steam tubular heaters 3 and 4.

A small amount of acid may be pumped into the heated water flowing in conduit 28 or in conduit 5 from the valved conduit 18 leading from a suitable source of acid. The amount of acid added is preferably sufficient to reduce the pH value of the water to 6.8–7.2. Proper control of the acidity is described in the copending application Serial No. 253,306, now patent No. 2,756,035. In passing through the indirect steam heaters 3 and 4, the water may be heated as high as about 300° F. or suitably to 296° F.

The water from these tubular heaters flowing through the conduit 5 is then introduced as a spray into the dome of the column of the high pressure steam heater or tower 6. In this heater the temperature of the water is raised to 310° to 365° F., ordinarily to 325° F. by contact with a countercurrent flow of superheated steam introduced at a lower level in the column by means of the conduit 7. Constant pressure regulating valves 9 and steam trap 10 serve to maintain the correct pressures in the heaters 3 and 4 as well as in the direct steam high pressure heater 6. The heated water flows from this high pressure heater 6 through the conduit 17 and is pumped into the sulfur wells under high pressure in accordance with conventional procedures.

The steam for heating the water in the high pressure heater may be introduced at 103 p.s.i.a. at 750° F. In the heater, the saline water is heated by de-superheating the steam, the same pounds of steam leaving the heater as entering. Part of this exhaust steam (49,000 lbs./hr. at 95 p.s.i.a.) from the high pressure heater 6 flows through the conduit 8 containing the regulating valve 9 to the low pressure steam tubular heaters 4 and 3 in succession. Here the steam is condensed and flows through the conduit 12 containing the constant pressure steam trap 10 to the collecting tank 13. After purification, as by de-aeration (not shown), this condensate is subsequently employed in the boilers 16a for forming the steam used in the heating operation.

The condensate is pumped through the line 15 to the boilers 16a, suitably of water tube construction. The steam here produced (83,000 lbs./hr. at 415 p.s.i.a.) flows through the conduit 29, the turbines 31, exhausting at 113 p.s.i.a., and through conduit 32 to the superheaters 16b where its temperature is raised suitably to 750° F. The turbines 31 provide power for generators and pumps used in the mining process. The burner gases for the superheater are provided by the burner 33. The waste flue gases from the boilers and from the superheater flow through the conduit 24 to the column 21 as hereinbefore stated. The steam flowing from the superheater 16b flows through the conduit 7 to the high pressure steam heater 6 as hereinbefore described.

Another part of the de-superheated steam (8,000 lbs./ hr.) flowing through the conduit 8 is utilized in the sulfur wells and flows thereto through the valved conduit 35. The third and remaining part of the steam is conducted in parallel with the heater 4 through a branch conduit 36 through a turbine 37 and thence through conduit 38 to the indirect or tubular heater 3, the amount of steam introduced into the heater being 26,000 lbs./hr. at 25 p.s.i.a.

Because of the recovery of the condensate from the indirect heater 3 very little make up water is required for the system. Additional water as required may be introduced into the tank 13 by means of the conduit 14 connected to a fresh water storage tank. The make-up water can be obtained as desired by actually evaporating water from the high pressure heater by flowing through it more superheated steam than that required for heating to the desired temperature or by withdrawing hot saturated gases from the direct contact heater 21, and treating the same in the equipment and by the procedure described in the co-pending application which is now Patent No. 2,756,029. The only fresh water needed in addition to boiler make up is for boiler blow down, drinking water and other minor requirements.

Additional power as well as compressed air required for the mining operation is generated by a gas engine 39. Cooling water for the gas engine is provided from the tank 41 connected to the tank 13 by conduits 14 and 42. The water from this tank is pumped through the conduit 43 to the gas engine 39. The used cooling water flows from the gas engine 39 through the conduit 44 to the heat exchanger 45 and thence back to the tank 41 through the conduit 46. The heat carried into the exchanger 45 is taken up by part of the raw saline water flowing to the tower 21. This water is taken from the conduit 1 through the conduit 47 connected to the heat exchanger 45. The resulting heater water is returned into the conduit 48 and introduced at an intermediate point as hereinbefore described. Part of the power generated in the gas engine produces the compressed air employed in the sulfur well, this compressed air being conducted to the sulfur well through the conduit 51.

From the foregoing description it will be seen that the water heating process has been integrated into a complete sulfur mining plant with very high thermal efficiency. Balanced quantities of hot mine water, steam power, electric power, service water, compressed air for pumping the sulfur wells and steam for heating the sulfur handling equipment are provided.

The apparatus and process of the present invention have the outstanding advantage that hard scale formation is substantially avoided. It will be noticed that the final stage of heating is carried out in such manner that there are no heat transfer surfaces to become fouled with scale. It will also be noticed that the intermediate heating in the indirect exchangers is controlled such that the water-side temperatures of the exchanger tubes are below the temperature at which hard scale, particularly calcium sulfate, is formed. In the treatment of some saline water, soft sludge may be formed in the exchanger tubes, but this may be periodically blown out without difficulty.

It will be understood that the temperatures and pressures and other specific data herein set forth are given by way of example and that the present invention extends to all equivalents which will occur to those skilled in the art.

I claim:

1. A continuous method for producing hot process water from natural waters having scale-forming salts therein, in substantial quantities for industrial use without causing excessive hard scale formation in the heating equipment used which comprises heating a stream of the natural water to an elevated temperature by flowing the same in indirect heat exchange with substantially saturated steam at a pressure sufficiently low to prevent heating of the heating surfaces of the exchanger to a temperature that would result in appreciable deposition of hard scale thereon, next raising the temperature of the heated water under pressure by contacting the same only with superheated steam thereby further heating the same to the desired hot process water temperature and thus at the same time providing the saturated steam used in the preceding step, collecting the condensate resulting from the indirect heating step, converting said condensate back to superheated steam for direct contact with the heated water to be further heated as specified herein, and flowing the further heated hot process water in liquid state still containing scale-forming salts to a point of utilization.

2. A process for providing a continuous stream of hot process water at sulfur mining temperature from scale-forming waters without appreciable deposition of hard scale which comprises heating scale-forming water to a temperature of 300° F. maximum by indirect heat transfer from substantially saturated steam by contact with heating surfaces maintained at a temperature below that at which any substantial amount of hard scale forms on the heat transfer surfaces, thereby also condensing said steam, further raising the temperature of the resulting hot water under pressure to the desired hot process water temperature of from 310-365° F. by directly contacting the same only with superheated steam, thereby also providing the saturated steam used in the preceding step, converting the condensate back to superheated steam for directly contacting with the flowing stream of heated water to be further heated as specified herein, and flowing the further heated hot process water still containing scale-forming salts to a point of utilization.

3. A continuous method for producing, from natural waters containing scale-forming salts, hot process water under pressure in substantial quantities for industrial use without causing excessive hard scale formation in the heating equipment used which comprises heating a flowing stream of said natural water to a temperature of from 250-300° F. by indirect heat exchange with saturated steam and at the same time condensing the steam, converting the condensate thus obtained back to steam, superheating said steam, introducing the superheated steam thus obtained into a heating tower under superatmospheric pressure and into direct intimate contact with a counter-currently flowing stream of the heated process water thereby raising its temperature to 310-365° F. and also at the same time producing the saturated steam used in the herein defined process and flowing the hot process liquid water thus obtained still containing scale-forming salts to a point of utilization.

4. A continuous method for producing, from natural waters, hot process water under pressure in substantial quantities for industrial use which comprises heating natural water by flowing a stream of the same into direct contact with hot combustion gases, heating the resulting water to a higher intermediate temperature by flowing the same in indirect heat exchange with substantially saturated steam thereby also condensing said steam, recovering the condensate for reuse in producing additional steam, further heating the processed natural water thus obtained under pressure by directly contacting the same with superheated steam thereby also providing the saturated steam used in the preceding heating step and flowing the hot process water thus obtained to a point of utilization.

5. A continuous method for producing, from natural waters, hot process water in substantial quantities for industrial use which comprises heating natural water by flowing the same into direct contact with waste flue gases obtained in the herein specified process, heating the resulting water to a higher temperature by directly contacting the same with burner gases, heating the hot water thus obtained to a still higher temperature by indirect heat exchange with substantially saturated steam thereby condensing the steam, recovering the condensate for reuse in producing superheated steam, and further heating the resulting processed natural water under pressure by directly contacting the same with superheated steam thereby also providing the saturated steam used in the preceding saturated steam heating step.

6. A process for providing hot process water and power requirements for a sulfur mining plant which comprises heating a continuous flow of natural water to be introduced into the sulfur mine by directly contacting the same with hot combustion gases at least in part composed of waste flue gases, heating the resulting water to a higher temperature by flowing a stream of the same in indirect heat change with substantially saturated steam, thereby also condensing said steam, further heating the resulting hot water under pressure to a temperature required for sulfur mining by directly contacting the same with superheated steam and at the same time providing the saturated steam used in the preceding heating step, converting the said condensed steam back to steam by means of burner gases, flowing said last mentioned steam through turbine means thereby providing power requirements for generators and pumps used in the mining process, superheating the last mentioned effluent steam by means of burner gases, thereby providing the superheated steam employed in the herein specified process, and utilizing waste flue gases obtained in the process for the initial direct heating of the natural water as hereinbefore specified.

7. A heating system for providing a continuous stream of hot process water under pressure from natural waters which comprises in combination a direct contact gas tower heater, an indirect heat exchanger, a direct contact steam heater, a conduit for introducing natural water to be heated into said gas tower heater, conduit means connecting said heaters in series for the passage of water therethrough, a discharge conduit connected to said direct contact steam heater for conducting therefrom the heated process water produced therein, a pump in said conduit means for forcing the process water through said heaters, means connected to said gas heater for introducing hot combustion gases thereinto, a conduit connecting said direct contact steam heater with said indirect heat exchanger for conveying steam from the former to the latter, means for generating superheated steam connected by a steam conducting conduit to said direct steam heater, conduit means connecting said indirect heat exchanger to said steam generating means for conveying condensate from said exchanger to said steam generating means.

8. The system defined in claim 7 in combination with an additional conduit means connecting said superheated-steam generating means with said direct contact gas tower heater for the transfer of flue gases to said tower.

9. The system defined in claim 8 wherein said superheated-steam generator is composed of a boiler and a steam superheater connected through a power generator for operating pumps and other ancillary equipment used in conjunction with the system.

10. The system defined in claim 9 wherein said boiler as well as said superheater is connected through conduits to said direct contact gas heater for the transfer of flue gases thereto.

11. The system defined in claim 10 in combination with a gas engine operatively connected to an air compressor employed in connection with the utilization of the heated process water flowing from the hereinbefore specified discharge conduit connected to the direct contact steam heater for conducting therefrom the heated process water produced in said heater, a conduit connecting said gas engine with said direct contact gas tower heater for the transfer of waste flue gases to said gas tower heater.

References Cited in the file of this patent

UNITED STATES PATENTS

| | | |
|---|---|---|
| 1,323,847 | Dryen | Dec. 2, 1919 |
| 1,817,349 | Clark | Aug. 4, 1931 |
| 1,852,293 | Engler | Apr. 5, 1932 |
| 2,071,693 | Hines | Feb. 23, 1937 |
| 2,369,573 | Kalous et al. | Feb. 13, 1945 |
| 2,406,581 | Bergstrom et al. | Aug. 27, 1946 |
| 2,459,302 | Aronson | Jan. 18, 1949 |
| 2,647,370 | Miller | Aug. 4, 1953 |